United States Patent [19]
O'Brien et al.

[11] Patent Number: 5,313,333
[45] Date of Patent: May 17, 1994

[54] METHOD AND APPARATUS FOR COMBINED ACTIVE AND PASSIVE ATHERMALIZATION OF AN OPTICAL ASSEMBLY

[75] Inventors: Michael J. O'Brien; William B. Smith, both of Rochester, N.Y.

[73] Assignee: Estman Kodak Company, Rochester, N.Y.

[21] Appl. No.: 993,887

[22] Filed: Dec. 23, 1992

[51] Int. Cl.$^5$ .............................................. G02B 7/02
[52] U.S. Cl. ................... 352/820; 359/811; 359/819
[58] Field of Search ............... 359/391, 395, 507, 512, 359/819–820, 822–823, 830; 385/32, 33; 372/9, 21, 27, 32, 36, 69, 98

[56] References Cited

U.S. PATENT DOCUMENTS

| | | | |
|---|---|---|---|
| 4,525,745 | 6/1985 | Ghaem-Maghami et al. | 358/237 |
| 4,604,753 | 8/1986 | Sawai | 372/36 |
| 4,656,635 | 4/1987 | Baer et al. | 372/69 |
| 4,730,335 | 3/1988 | Clark et al. | 372/98 |
| 4,850,674 | 7/1989 | Hasselskog | 359/823 |
| 4,861,137 | 8/1989 | Nagata | 359/820 |
| 4,993,801 | 2/1991 | Sarraf | 385/31 |
| 5,210,650 | 5/1993 | O'Brien et al. | 359/820 |

FOREIGN PATENT DOCUMENTS

| | | |
|---|---|---|
| 2830341 | 7/1978 | Fed. Rep. of Germany . |
| 58-203405 | 11/1983 | Japan . |
| 127800 | 3/1919 | United Kingdom . |
| 1325936 | 12/1919 | United Kingdom . |

*Primary Examiner*—Loha Ben
*Assistant Examiner*—Thong Nguyen
*Attorney, Agent, or Firm*—Thomas H. Close

[57] ABSTRACT

An athermalized optical assembly includes a laser beam source, such as a laser diode, and a collimator lens which are together mounted in an active thermally-compensated structure. The laser diode source is mounted in a beam source mount thermally isolated from a supporting base plate that serves as the assembly mounting surface. The collimating lens is mounted on a flexure plate having a kinematic hinge. The flexure plate is supported by concentric inner and outer compensation rings of dissimilar materials that are arranged to support the flexure plate at a predetermined distance above the base. The difference in the coefficient of thermal expansion (CTE) of each compensation ring is chosen such that the flexure plate kinematic hinge is passively operated to approximately compensate for thermal shifts in system focal length while maintaining radial and angular alignment of the lens relative to the laser diode source, so as to provide controlled axial movement of the collimating lens. A first thermal element, operatively connected to the beam source mount, and a second thermal element, operatively connected to the outer compensation ring and thermally isolated from the inner compensation ring, are controlled according to the inner compensation ring, outer compensation ring, and lens barrel temperatures. The thermal elements actively regulate the inner and outer compensation ring temperatures so as to supplant or correct any deficiencies in the accuracy or range of motion afforded by the passive operation of the kinematic hinge. Accordingly, the combination of passive and active athermalization provides more exact compensation for thermally-induced focal shifts than may be obtained by a passive or active system acting alone.

12 Claims, 2 Drawing Sheets

METHOD AND APPARATUS FOR COMBINED ACTIVE AND PASSIVE ATHERMALIZATION OF AN OPTICAL ASSEMBLY

CROSS REFERENCE TO RELATED APPLICATION

This patent application is related to copending, commonly-assigned U.S. patent application Ser. No. 860,936, filed in the names of O'Brien et al on Mar. 31, 1992, and entitled "COMPACT, PASSIVELY ATHERMALIZED OPTICAL ASSEMBLY", now U.S. Pat. No. 5,120,650 the disclosure of which is included herein by reference.

BACKGROUND OF THE INVENTION

The present invention relates to means for effecting temperature-compensation of focal length in an optical assembly.

Certain optical assemblies such as those found in laser output scanners require a stable monochromatic collimated light beam provided by a laser diode and a collimating lens. For adequate optical performance, the beam source must maintain a predetermined beam quality over a wide ambient temperature range. In conventional apparatus, the beam source and lens are mounted in a mechanical structure that attempts to maintain the beam focal length while the apparatus undergoes temperature-induced structural changes. Hence, the athermalization (i.e., thermal compensation) is effected either passively or actively.

Passive compensation systems typically rely on the differences in coefficients of thermal expansions of the various elements in the optical system such that there is minimal net focus shift with temperature. For example, the conventional approach is to employ concentric tube systems, which, if constructed from common materials, are too large or bulky. U.S. Pat. No. 4,730,335 discloses a series of interlocking tubes each carrying a single optical element of an optically-pumped solid-state laser. Active compensation systems typically rely on active temperature control of the various elements in the optical system such that there is minimal temperature change. For example, a thermoelectric cooler is employed in the apparatus disclosed in U.S. Pat. No. 4,604,753 to stabilize the output power and wavelength of a laser diode beam source; U.S. Pat. Nos. 4,656,635 and 4,993,801 disclose a beam source wherein a thermoelectric cooler is employed to control the operating temperature of the entire head.

However, the accuracy of a passive system will depend upon the CTE of the materials chosen for the construction of certain components of the system. Thus, some passive designs cannot be manufactured because the desired CTE is simply not exhibited by the materials suited for fabricating the requisite system components, or because the CTE is available but tends to be unstable. Further, the accuracy of known active systems is often dependant upon the construction of complex components in exacting tolerances. The foregoing approaches have accordingly been found to be more costly and complex, and offer less precision and less range of adjustment, than is desired for certain applications.

SUMMARY OF THE INVENTION

A preferred embodiment of an improved athermalized optical assembly may be constructed according to the present invention to include a laser beam source, such as a laser diode, and a collimator lens which are together mounted in an active thermally-compensated structure. The laser diode source is mounted in a beam source mount that is thermally isolated from a supporting baseplate that serves as the assembly mounting surface. The collimating lens is mounted on a flexure plate having a kinematic hinge. The flexure plate is supported by concentric inner and outer compensation rings of dissimilar materials that are arranged to support the flexure plate at a predetermined distance above the base. The difference in the coefficient of thermal expansion (CTE) of each compensation ring is chosen such that the flexure plate kinematic hinge is passively operated to approximately compensate for thermal shifts in system focal length while maintaining radial and angular alignment of the lens relative to the laser diode source, so as to provide controlled axial movement of the collimating lens. A first thermal element, operatively connected to the beam source mount, and a second thermal element, operatively connected to the outer compensation ring and thermally isolated from the inner compensation ring, are controlled according to the inner compensation ring, outer compensation ring, and lens barrel temperatures. The thermal elements actively regulate the inner and outer compensation ring temperatures so as to supplant or correct any deficiencies in the accuracy or range of motion afforded by the passive operation of the kinematic hinge. Accordingly, the combination of passive and active athermalization provides more exact compensation for thermally-induced focal shifts than may be obtained by a passive or active system acting alone.

The invention, its objects, and advantages, will become more apparent in the detailed description of the preferred embodiments presented below.

DETAILED DESCRIPTION OF THE PREFERRED EMBODIMENTS

Figure 1:
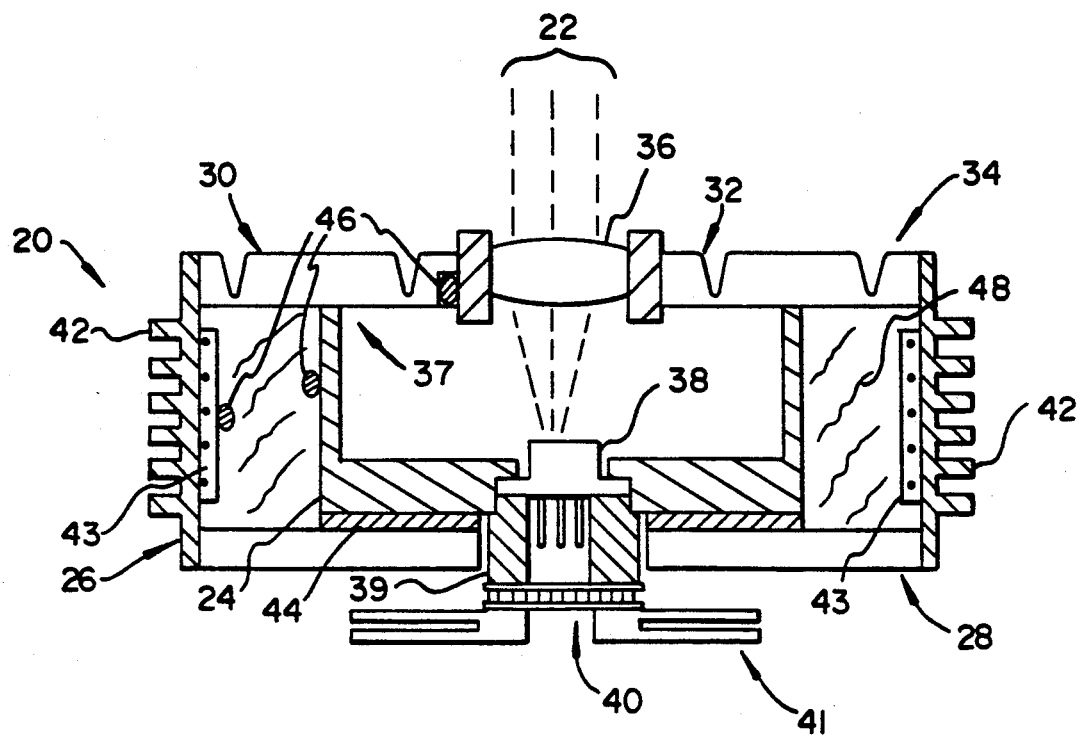
FIG. 1 is a simplified side sectional view of an optical assembly constructed according to the present invention.

Preferred embodiments of the present invention will now be described with reference to the accompanying drawings, wherein like reference numerals refer to like components.

As shown in FIG. 1, a preferred embodiment of the present invention may be constructed as an athermalized optical assembly 20 for use in providing a collimated laser beam 22 of essentially constant quality over a wide range of operating temperature. The thermally-compensated structure includes inner and outer compensation rings 24, 26 each attached between a base plate 28 and a flexure plate 30. A kinematic hinge, preferably in the form of circular notches 32, 34 in the flexure plate, allows localized deformation at the flexure plate at one or more portions of the plate 30. The base plate 28 is of sufficient thickness and rigidity that any deformation therein is insignificant relative to the deformation experienced by the flexure plate 30. A collimating lens 36, located in the flexure plate 30, is aligned with the optical axis of the light beam 22. The beam source is preferably in the form of a laser diode 38 fixed in the base plate 28. Radial and angular alignment of the lens 36 to the diode 38 is maintained due to the cylindrical geometry of the optical assembly 20. The assembly is contemplated as being initially aligned and focused during manufacturing by techniques known in the art.

The contemplated passive response of the compensation rings 24, 26 to a temperature shift will then produce an axial motion of the lens 36 with respect to the beam source so as to approximately correct for focal length shifts that would otherwise occur. Materials for the compensation rings 24, 26 are chosen to have different coefficients of thermal expansion ($\alpha_1$ and $\alpha_2$), such that each compensation ring experiences change in height as the temperature changes. Because the kinematic hinge is operable in the upper flexure plate 30 for small deflections, the lens 36 will move axially due to the "lever" action about a fulcrum point 37 located at the top of the inner compensation ring 24.

The inner compensation ring 24 is formed as an integral part of the laser diode mounting block 39 which together are cooled by a first thermal element, preferably in the form of a thermo-electric cooler (TEC) module 40 and heatsink 41. The outer compensation ring 26 is contiguous with, or extended to form, an integral radial heat sink 42 on its exterior wall. A second thermal element, preferably in the form of an electrical heater 43, is operatively connected to the interior wall of the outer compensation ring 26. The flexure plate 30 is formed of a material selected for its low thermal conductivity so as to thermally isolate the inner and outer compensation rings 24, 26. The inner compensation ring 24 and diode mount 39 are thermally isolated from the base plate 28 by a thermal isolation spacer 44. Insulation 48 is positioned to fill the cavity between the inner and outer compensation rings. Thermistors 46 are located on the inner compensation ring, outer compensation ring, and lens barrel to monitor the temperatures of those components.

Figure 2:
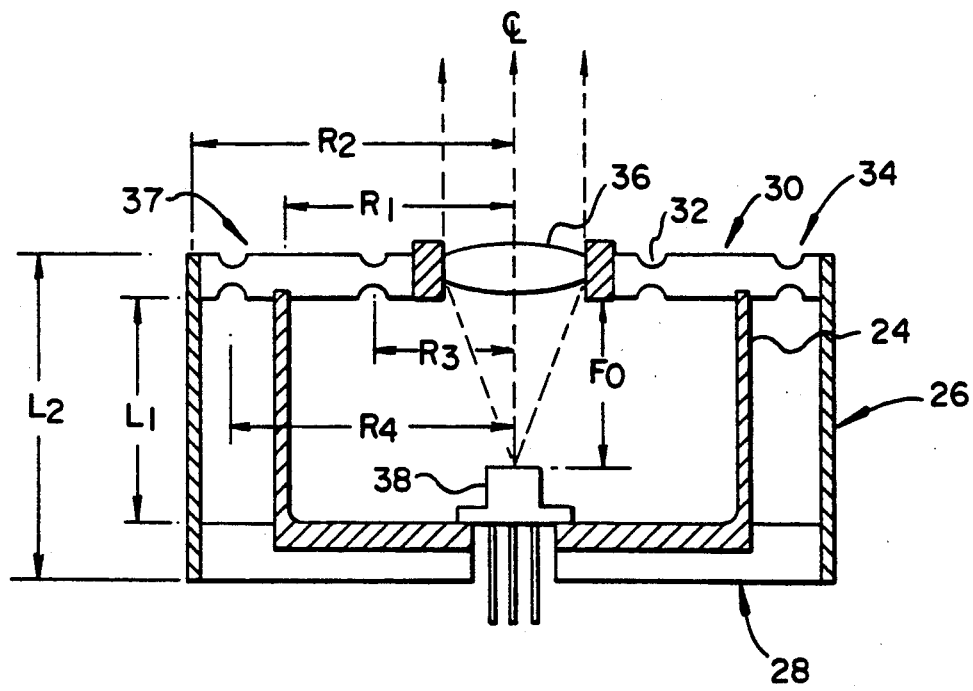
FIG. 2 is a simplified diagrammatic model useful in the analysis of the operation of the assembly of FIG. 1.

Important dimensions for modelling the thermo/mechanical operation of the assembly 20 are illustrated in FIG. 2. The degree of kinematic movement of the collimating lens can be controlled by several factors. A variety of temperature compensation effects can be obtained for a given outer compensation ring height by varying the dimensions of the hinged sections of the flexure plate 30 and the locations of the inner and outer compensation rings 24, 26. Because the stiffness of the flexure plate 30 at the hinge points (notches 32, 34) is very low compared to the stiffness of the bulk material in the remainder of the flexure plate, the radial level arm input and output values are set by the radial amounts $R_4$ and $R_3$, respectively. A fulcrum position 37 is established by choosing an inner compensation ring radius $R_1$, at a predetermined point between $R_3$ and $R_4$. This levering arrangement provides an amplification or reduction of mechanical displacement that depends upon the ratio of ($R_4$-$R_1$) to ($R_1$-$R_3$). Kinematic hinge operation is independent of the outer compensation compensation ring radius $R_2$ because the flexure plate 30 bulk thickness is selected such that the bending moment is transmitted directly to the hinge area at $R_4$. Also, because the compensation rings 24, 26 have different coefficients of thermal expansion ($\alpha_1$ and $\alpha_2$), an input to the lever system is proportional to the inner and outer compensation ring lengths $L_1$ and $L_2$, the CTE difference ($\alpha_1$-$\alpha_2$), and the change in temperature DT experienced by the structure.

Inner and outer compensation ring lengths $L_1$, $L_2$ and the coefficients of thermal expansion ($\alpha_1$ and $\alpha_2$), as well as the CTE of the base ($\alpha_3$) may be varied, and once the change $D_f$ in the optical system focal length (optical and mechanical) with temperature has been determined, the values of $L_1$, $L_2$, $\alpha_1$, $\alpha_2$, and $\alpha_3$ may be optimized based on the relationship:

$$D_f = L_1\alpha_1 + \left[\frac{R_1 - R_3}{R_4 - R_1}\right][L_2(\alpha_2 - \alpha_3) + L_1(\alpha_3 - \alpha_1)] \quad (1)$$

where:
$L_1$ = inner compensation ring length
$L_2$ = outer compensation ring length
$R_1$ = inner compensation ring radius
$R_3$ = inner hinge radius
$R_4$ = outer hinge radius
$\alpha_1$ = inner compensation ring CTE
$\alpha_2$ = outer compensation ring CTE
$\alpha_3$ = base material CTE For the case where the inner and outer compensation rings are of equal length ($L_1 = L_2 = L_o$):

$$D_f = L_o\left[\alpha_1 + (\alpha_2 - \alpha_1)\frac{R_1 - R_3}{R_4 - R_1}\right] \quad (2)$$

Generally, the above-listed thermal coefficients will be defined by the materials and manufacturing methods selected in producing the assembly. $R_3$, $R_4$, and $L_2$ are typically defined according to the lens characteristics and available space, leaving $L_1$ and $R_1$ selectable for establishing the desired degree of thermal compensation. Further, it is believed that to reduce effects of manufacturing tolerances, one would:

a. maximize ($R_4$-$R_3$)/($R_1$-$R_3$);
b. maximize ($\alpha_2$)/($\alpha_1$); and
c. set ($R_4$-$R_3$)/($R_1$-$R_3$) = ($\alpha_2$)/($\alpha_1$)

From the geometric relationships of the components, the total lens movement $\delta$ is calculated as:

$$\delta = [(R_1-R_3)/(R_4-R_1)][\alpha_2(T_2-T_0) - \alpha_1(T_1-T_0)]L_o \quad [3]$$

where
$T_0$ = nominal system temperature at initial assembly of the system
$T_1$ = temperature of inner compensation ring
$T_2$ = temperature of outer compensation ring The change in system focal length $D_f$ is linearly proportional to temperature and is expressed as:

$$D_f = K(T_3 - T_0) \quad [4]$$

where $T_3$ = lens temperature; K = the measured focal shift constant for the lens. (The units must be assembled and focused at a constant initial temperature.) Since the outer compensation ring temperature $T_2$ must be controlled and the other system parameters are fixed, the control equation becomes:

$$T_2 = T_0 + (\alpha_1/\alpha_2)[T_1 - T_0] + [K/\alpha_2 L_o][T_3 - T_0] \quad [5]$$

It is contemplated that those skilled in the art will optimize the geometry of the optical assembly 20 by varying the foregoing parameters, to minimize sensitivity to manufacturing tolerances, or for other reasons. One embodiment of the optical assembly 20 could be constructed wherein $\alpha_2$ is greater than $\alpha_1$, to provide an increase in focal distance with an increase in ambient temperature. A second alternative embodiment of optical assembly 20 could be constructed to provide a decrease in focal distance with an increase in ambient temperature. In yet another alternative embodiment, the flexure plate response may be made nonlinear by use of a flexure plate having a stiffness that varies according to its radial dimension.

Figure 3:
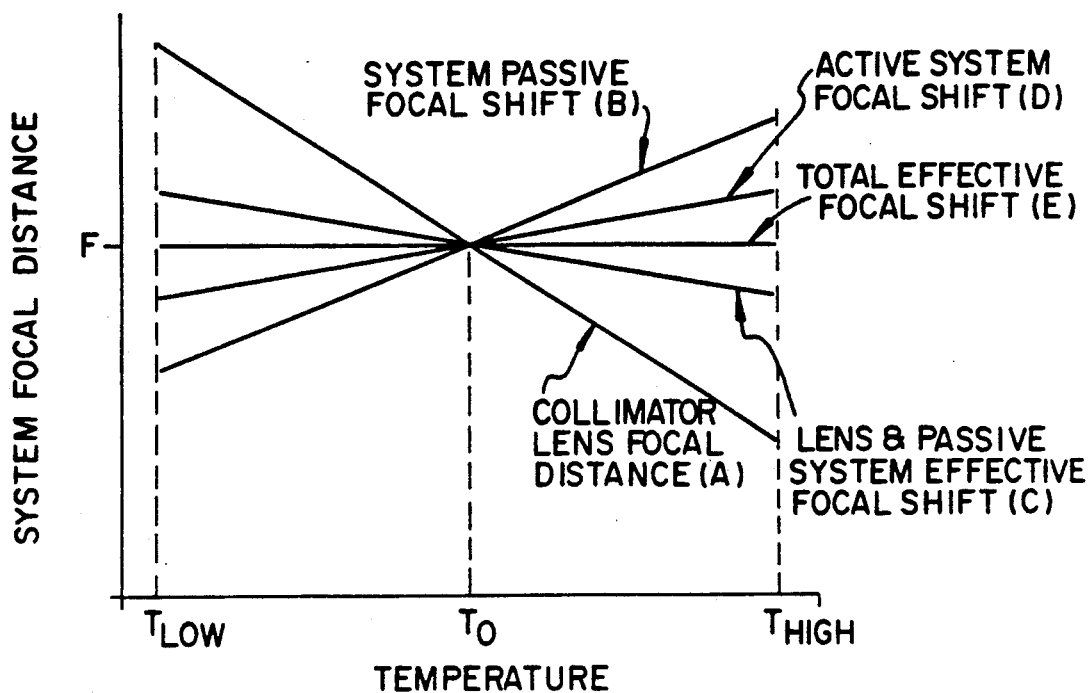
FIG. 3 is a graphical representation of the change in focal distance of the assembly of FIG. 1 according to ambient temperature.

FIG. 3 graphically illustrates an example of the focal shift effected by a proper selection of materials and an appropriate construction and operation of the assembly 20. The uncompensated response of the collimator's focal length to temperature is shown by line (A), which reflects the uncompensated shift in the system optical focal length due to the effects of changes in the lens focal length and the relative beam source position. The purely passive response of the assembly is indicated by line (B). In a conventional passive athermalization scheme, lines (A) and (B) would be expected to have equal and opposite slopes for perfect compensation. As mentioned in the Background of the Invention, however, the limited selection of $\alpha_1$ and $\alpha_2$ from the materials suited for manufacturing would heretofore result in a less-than-desired overall system response, represented by line (C). However, and according to a feature of the present invention, the remaining correction necessary for accurate athermalization is obtained by controlling the inner and outer compensation ring temperatures such that slope of line (D), that is, the active system focal shift, is made equal and opposite to the slope of line (C). The resulting (compensated) total system response is line (E), which indicates that the effective system focal length is more accurately athermalized (i.e., made constant with temperature). Furthermore, it is contemplated that the response indicated by line (E) is most stable when $\alpha_1$ and $\alpha_2$ are selected to provide all available passive compensation, thereby minimizing the amount of active compensation necessary via the control of the inner and outer compensation ring temperature differential ($T_2-T_1$). The active athermalization response of the system can thereby make up for the shortcomings of the passive athermalization response.

Figure 4:
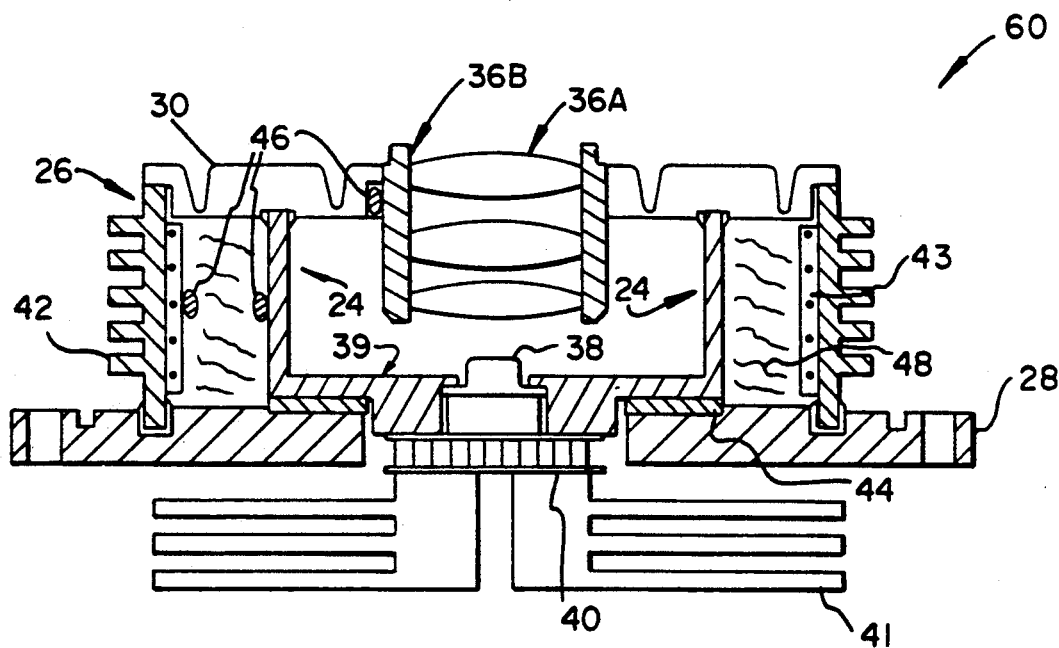
FIG. 4 is a side sectional view of an particularly preferred embodiment of the assembly of FIG. 1.

A particularly preferred embodiment of an athermalized optical head assembly 60, constructed according to the present invention for use in a high resolution output writer, is illustrated in FIG. 4. The beam source 38 is a laser diode commercially available as a Hitachi Model HL7806G laser diode. The internally cooled diode mount 39 and inner compensation ring 24 may be formed of yellow brass. The thermoelectric cooler (TEC) module 40 (commercially available as the Marlow Industries Model SD1507) is attached to the diode mount 39 along with the associated heat sink 41 to maintain the beam source 38 and inner compensation ring 24 at a constant temperature. The thermoelectric cooler (modified to include a center hole for wire routing) 40 is clamped between the diode mount 39 and a black anodized aluminum radial fin heat sink 41. The inner compensation ring/diode assembly is mounted to the baseplate 28, and thermally isolated from it, with a 15% glass-filled polycarbonate isolation washer 44 that has nearly the same CTE as the inner compensation ring 24. The thermoelectric cooler module 40 is thereby required to remove heat from the diode mount 39 and inner compensation ring 24 only.

The flexure plate 30 is preferably molded from 20% glass filled polycarbonate to minimize the heat transfer from the outer compensation ring 26 to the inner compensation ring 24. The inner and outer compensation rings 24, 26 are cemented with an appropriate adhesive to the underside of the flexure plate. A bore in the flexure plate 30 is configured to hold the collimating lens 36A (commercially available from Eastman Kodak Company as the Model Q-28).

The outer compensation ring 26 is also cemented to the baseplate 28. As illustrated, the outer compensation ring 26 is preferably formed as a finned aluminum cylinder with an electrically-isolated nichrome heating wire wound in a non-inductive fashion along the inside wall of the outer compensation ring 26. Fiberglass wool is used as the insulation 48 that fills the cavity between the inner and outer compensation rings 24, 26. Linearized thermistors 46 are employed to measure the pertinent temperatures at the center of the inner compensation ring wall, and near the flexure plate on the lens barrel. The thermistors 46, which are commercially available from Yellow Springs instruments as model YSI-44018 thermistors, are preferably mounted with a thermally-conductive adhesive such as that commercially available as Loctite OUTPUT 384. It is also contemplated that the assembly may be filled with an inert gas before final lens alignment to thus achieve both a degree of mechanical protection and a sealed environment for the beam source.

An athermalized optical assembly constructed according to the present invention affords the following, and other, benefits and advantages. The components of the assembly may be easily produced and can be successfully designed to minimize component sensitivity to manufacturing tolerances. The assembly is suitable for addressing a wide range of focal length shifts that otherwise could not be compensated. In contrast to the lesser number of parameters available for compensation in prior art passive compensation schemes, the present invention allows optical thermal compensation by varying three sets of passive control parameters (L, R, $\alpha$) plus two active control parameters (the temperatures $T_1$ and $T_2$ of the inner compensation ring 24 and outer compensation ring 26, respectively). In addition, any second-order nonlinearities in the passive athermalization can be corrected by proper control of the active athermalization. Therefore, the contemplated optical assembly offers very accurate athermalization, one that is substantially more accurate than achievable by purely passive designs.

The invention has been described in detail with particular reference to the preferred embodiments thereof, but it will be understood that variations and modifications can be effected within the spirit and scope of the invention.

What is claimed is:

1. Apparatus for providing athermalized collimation of a beam source by a beam collimating means, comprising:

support means including a beam source mount for fixing the beam source at a predetermined position thereon and for thereby defining a light beam optical axis, said beam source mount having a coefficient of expansion $\alpha_1$ and being thermally isolated from said support means;

a flexure plate adapted for aligning the beam collimating means at a beam collimating means position on the optical axis, and having a kinematic hinge operable to displace the collimating means along the optical axis;

thermal compensation means located with respect to the kinematic hinge so as to provide a combination of active and passive operation of the kinematic hinge to thereby displace the collimating means, including:
a) an inner compensation ring, thermally integrated with the beam source mount, operatively connected between the support means and the flexure plate at a first predetermined radius $R_1$ from the optical axis, and having the coefficient of expansion $\alpha_1$;
b) first thermal element means operatively connected to the inner compensation ring and the beam source mount for establishing a first temperature $T_1$ therein;
c) an outer compensation ring, operatively connected between the support means and the flexure plate at a second predetermined radius $R_2$ from the optical axis, and having a selected coefficient of expansion $\alpha_2$; and
d) second thermal element means operatively connected to the outer compensation ring for establishing a second temperature $T_2$ therein.

2. The apparatus of claim 1, wherein the inner and outer compensation rings are thermally isolated from the flexure plate and the support means.

3. The apparatus of claim 2, and wherein the kinematic hinge includes a radial notch in the flexure plate located between the inner compensating ring and the optical axis.

4. The apparatus of claim 1, wherein the kinematic hinge further comprises;
a first radial notch located in the flexure plate between the inner compensation ring and the optical axis; and
a second radial notch located in the flexure plate between the inner and outer compensation rings.

5. The apparatus of claim 4, wherein the inner compensation ring has length $L_1$, the outer compensation ring has length $L_2$, the first notch location has radius $R_3$, and the second notch location has radius $R_4$ and the apparatus has a change in focal length $D_F$, the apparatus being optimized according to the relationship:

$$D_f = L_o \left[ \alpha_1 + (\alpha_2 - \alpha_1) \frac{R_1 - R_3}{R_4 - R_1} \right].$$

6. The apparatus of claim 1, wherein the support means further comprises the light beam source.

7. The apparatus of claim 6, wherein the beam source further comprises a laser diode.

8. The apparatus of claim 6, wherein the first thermal element means further comprises heat sink means for dissipating heat from the thermal element means.

9. The apparatus of claim 1, wherein the first thermal element means is a thermoelectric cooler (TEC) module.

10. The apparatus of claim 1, wherein the second thermal element means is an electrical heating element.

11. The apparatus of claim 1, wherein the second thermal element means further comprises heat sink means operatively attached to the outer compensation ring for dissipating heat from the outer compensation ring.

12. Method for providing athermalized collimation of a beam source by a beam collimating means, comprising the steps of:
providing a support means including a beam source mount for fixing the beam source at a predetermined position thereon and for thereby defining a light beam optical axis, said beam source mount having a coefficient of expansion $\alpha_1$ and being thermally isolated from said support means;
providing a flexure plate adapted for aligning the beam collimating means at a beam collimating means position on the optical axis, and having a kinematic hinge operable to displace the collimating means along the optical axis;
locating a thermal compensation means with respect to the kinematic hinge so as to provide a combination of active and passive operation of the kinematic hinge to thereby displace the collimating means, including:
a) operatively connecting an inner compensation ring that is thermally integrated with the beam source mount between the support means and the flexure plate at a first predetermined radius $R_1$ from the optical axis, said inner compensation ring having the coefficient of expansion $\alpha_1$;
b) operatively connecting first thermal element means to the inner compensation ring and the beam source mount for establishing a first temperature $T_1$ therein;
c) operatively connecting an outer compensation ring between the support means and the flexure plate at a second predetermined radius $R_2$ from the optical axis, said outer compensation ring having a selected coefficient of expansion $\alpha_2$; and
d) operatively connecting second thermal element means to the outer compensation ring for establishing a second temperature $T_2$ therein.

* * * * *